US012035859B2

(12) United States Patent
Smith

(10) Patent No.: US 12,035,859 B2
(45) Date of Patent: Jul. 16, 2024

(54) ENVIRONMENTAL BLOCK FOR CARPET CLEANING

(71) Applicant: Jacolby L. Smith, Garland, TX (US)

(72) Inventor: Jacolby L. Smith, Garland, TX (US)

( * ) Notice: Subject to any disclaimer, the term of this patent is extended or adjusted under 35 U.S.C. 154(b) by 403 days.

(21) Appl. No.: 17/069,737

(22) Filed: Oct. 13, 2020

(65) Prior Publication Data

US 2021/0106201 A1 Apr. 15, 2021

Related U.S. Application Data

(60) Provisional application No. 62/913,736, filed on Oct. 11, 2019.

(51) Int. Cl.

| | |
|---|---|
| ***A47L 11/40*** | (2006.01) |
| ***A47L 13/50*** | (2006.01) |
| ***E04G 21/24*** | (2006.01) |
| ***E05F 5/00*** | (2017.01) |

(52) U.S. Cl.

CPC ....... *A47L 11/4077* (2013.01); *A47L 11/4088* (2013.01); *A47L 11/4094* (2013.01); *A47L 13/50* (2013.01); *E04G 21/241* (2013.01); *E05F 5/00* (2013.01)

(58) Field of Classification Search

None

See application file for complete search history.

(56) References Cited

U.S. PATENT DOCUMENTS

| | | | | |
|---|---|---|---|---|
| 4,738,053 A * | 4/1988 | Biesenthal | ................ E06B 9/52 | 49/70 |
| 2007/0044274 A1* | 3/2007 | Chen | ..................... E05C 17/446 | 16/82 |
| 2009/0084326 A1* | 4/2009 | Watzke | ................ A01K 1/0017 | 119/843 |
| 2009/0165964 A1* | 7/2009 | Harbison | .................. E06B 9/42 | 160/327 |

* cited by examiner

*Primary Examiner* — Natasha N Campbell
*Assistant Examiner* — Pradhuman Parihar
(74) *Attorney, Agent, or Firm* — Thrasher Associates

(57) ABSTRACT

A carpet cleaning accessory device is provided. The carpet cleaning accessory device comprises an aperture stop configured to fit between an aperture frame and an aperture gate where the aperture stop has at least a first hole and a second hole. The device also includes a conduit having at least a first opening and a second opening, where the conduit is secured inside the aperture stop such that the first opening couples with the first hole and the second opening couples with the second hole. A curtain adapted to couple to the aperture frame and the aperture gate using a coupling assembly is also included to substantially block an opening between the aperture gate and the aperture frame.

11 Claims, 5 Drawing Sheets

ENVIRONMENTAL BLOCK FOR CARPET CLEANING

The invention s related to can claims priority from U.S. Provisional Patent Application No. 62/913,736 filed on Oct. 21, 2019 entitled CARPET CLEANING DOOR STOP to common inventor Jacolby Smith.

TECHNICAL FIELD

The present invention relates to a carpet cleaning accessory device and, particularly, to a carpet cleaning accessory device that substantially blocks the opening between the interior of a building and the exterior of a building during carpet cleaning.

BACKGROUND

Professional carpet cleaning is a big industry. Conventional methods of professional carpet cleaning involve using a high-power motor that creates much more suction than any vacuum intended for home use. Accordingly, the only way to get the benefits of the 'high-vacuum' into the home is to run hoses from the professional carpet-cleaning vehicle (typically, a van) into the home, apartment, or other building (collectively, "structure") being cleaned.

Unfortunately, this creates problems for the home, apartment, or building occupant, in at the cleaning hoses must enter the home through either a door or, far less frequently, a window (to simplify the discussion, this application will only discuss the door-condition in detail). This in turn means that the door must remain somewhat ajar while the structure is cleaned.

As one would expect, this literally opens the structure to a host of problems. For example, insects and critters can enter the structure through the ajar door, while pets and children may escape through the open door. In addition, tremendous volumes of indoor air escape the structure, leading to higher energy costs, discomfort for the occupants, as well as the smells and allergy issues that accompany the outdoor air. Accordingly, there exists the need for systems and devices that allow for carpet cleaning equipment to enter an open door or window, while isolating and separating the indoor environment from the outside. Additionally, it is desired that the systems and devices are easy to transport and set up by a single person, while being minimally intrusive to the structure. The present invention provides such systems and devices U.S. Pat. No. 4,267,618 to Cuscovitch discloses a carpet cleaning apparatus comprising a water supply, conduits with openings that extend through an opening having an aperture. U.S. Pat. No. 9,637,971 to Keatts discloses a screenlet comprising a frame and a flexible flap secured on one edge to the frame with the annular ring that includes an opening therethrough through which a cord or hose is passed. U.S. Pat. No. 7,913,741 to Aulet discloses a pass-through apparatus for screens providing a pass through connection opening for water hoses, electrical and power cords, telephone lines, and cable lines to freely pass through screens such as screen pool enclosures, screen doors, and the like. However, there is no professional carpet cleaning accessory that solves the problems addressed by the present invention. Specifically, there exists no professional carpet cleaning accessory that substantially blocks the openings between an open door and its frame during carpet cleaning.

This section describes technical field in detail and discusses problems encountered in the technical field. Therefore, statements in the section are not to be construed as prior art.

Further limitations and disadvantages of conventional and traditional approaches will become apparent to one of skill in the art, through comparison of described systems, devices with some aspects of the present disclosure, as set forth in the remainder of the present application and with reference to the drawings.

SUMMARY OF THE INVENTION

According to the embodiments illustrated herein, there is provided a professional carpet cleaning accessory device for blocking external bodies from entering the structure while carpet cleaning is in progress.

According to embodiments illustrated herein, there is provided a carpet cleaning accessory device. The carpet cleaning accessory device comprises a doorstop configured to fit between a door frame and an open door. In an embodiment, the doorstop has a plurality of holes. The carpet cleaning accessory device further comprises a conduit, placed inside the doorstop, having a plurality of openings such that the plurality of openings are aligned with each of the plurality of holes in the door stop. The carpet cleaning accessory device further comprises a flexible cloth adapted to attach to the door frame and the open door using a clamping mechanism comprising a plurality of clamps. In an embodiment, the flexible cloth is configurable to substantially block openings between the open door and the door frame.

According to embodiments illustrated herein, there is provided a method for carpet cleaning. The method comprises installing a doorstop, at a ground level using a plurality of antiskid objects affixed at the bottom of the door stop, between a door frame and an open door. In an embodiment, the doorstop has a plurality of holes. The method further comprises inserting at least one professional carpet cleaning hose via a plurality of openings of a conduit that is placed inside the door stop. In an embodiment, the plurality of openings of the conduit are aligned with the plurality of holes in the door stop. The method further comprises attaching a flexible cloth to the door frame and the open door using a clamping mechanism comprising a plurality of clamps. In an embodiment, the flexible cloth is configurable to substantially block openings between the open door and the door frame. The method further comprises initiating the carpet cleaning by connecting other end of the professional carpet cleaning hose to a high-pressure vacuum pump.

These features and advantages of the present disclosure may be appreciated by reviewing the following description of the present disclosure, along with the accompanying figures wherein like reference numerals refer to like parts.

Accordingly, the invention substantially blocks open spaces between an open (or "cracked") door and its door frame with a curtain of flexible cloth while at the same time allowing vacuum hoses for cleaning/rinsing/spraying/vacuuming to enter the structure to be cleaned without exposing the interior of the structure to outside environmental hazards. As the open spaces are covered, fewer insects and critters enter the stricture than through an ajar door. Similarly, pets and children are less likely to escape to the outside. Further, energy consumption is reduced. Thus, the disclosed professional carpet cleaning accessory device allows the carpet cleaning equipment to enter an open door or window, while isolating and separating the indoor environment from the outside, while also reducing smells and allergy issues that accompany the outdoor air. Additionally, the disclosed professional carpet cleaning accessory device is easy to transport and set up by a single person, while being minimally intrusive to the structure that is being cleaned.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale. Unless explicitly stated otherwise, conjunctive words (such as "or", "and", "including", or "comprising") should be interpreted in the inclusive and not the exclusive sense.

Various embodiments will hereinafter be described in accordance with the appended drawings, which are provided to illustrate, not limit, the scope, wherein similar designations denote similar elements, and in which.

DETAILED DESCRIPTION

Figure 1:
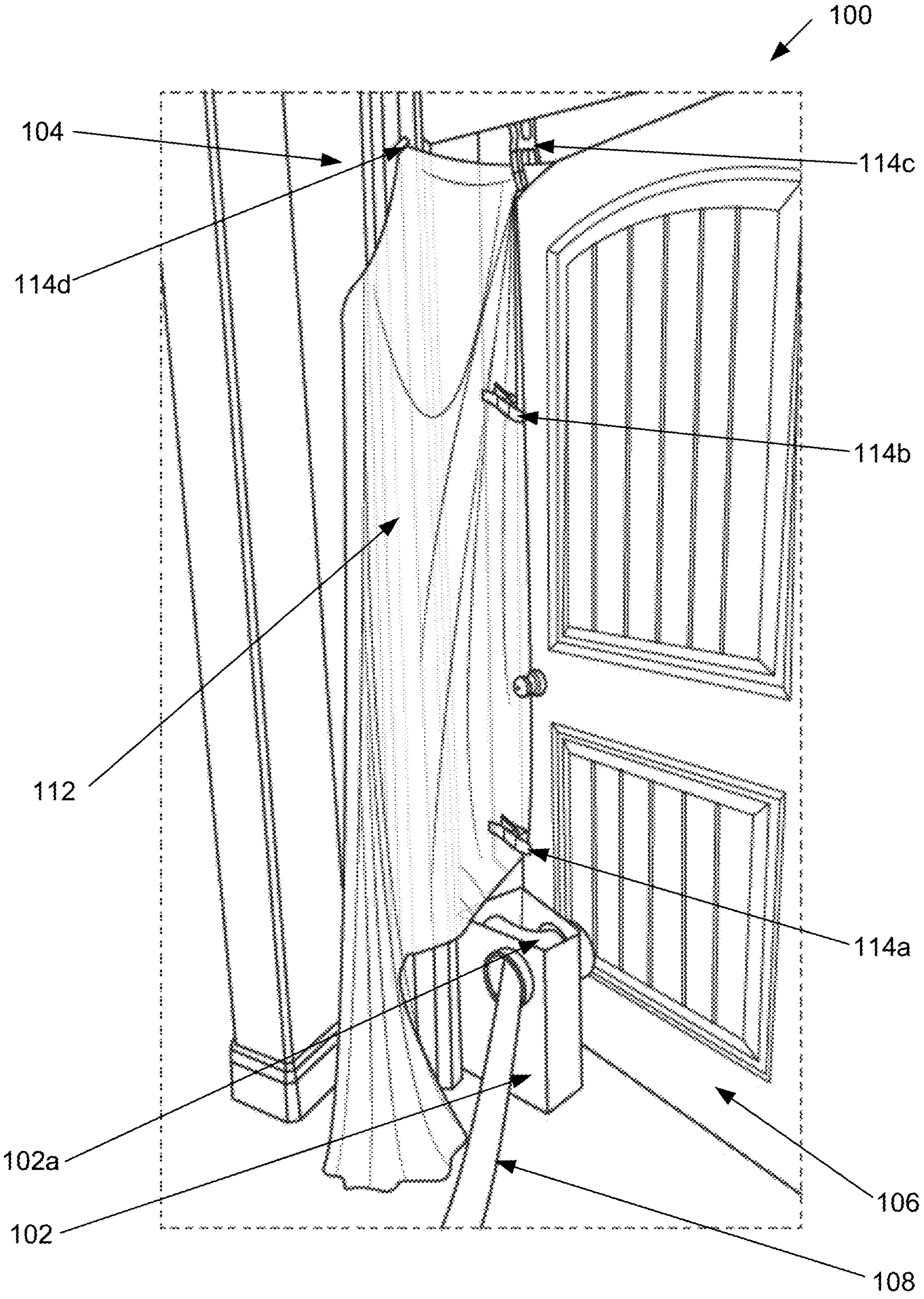
FIG. 1 illustrates the professional carpet cleaning accessory device in situ while performing cleaning.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment", "at least one embodiment", "an embodiment", "one example", "an example", "for example", and so on indicate that the embodiment(s) or example(s) may include a particular feature, structure, characteristic, property, element, or limitation, but not every embodiment or example necessarily includes that particular feature, structure, characteristic, property, element, or limitation. Furthermore, repeated use of the phrase "in an embodiment" does not necessarily refer to the same embodiment.

Unless defined otherwise, all technical and scientific terms used herein have the same meaning as commonly understood by one of the ordinary skills in the art to which this invention belongs. Although any method and material similar or equivalent to those described herein can also be used in the practice or testing of the present invention, the preferred methods and materials have been described. All publications, patents, and patent applications mentioned herein are incorporated in their entirety.

It is noted that as used herein and in the appended claims, the singular forms "a", "and", and "the" include plural referents, unless the context clearly dictates otherwise. In the claims, the terms "first", "second", and so forth are to be interpreted merely as ordinal designations; they shall not be limited in themselves. Furthermore, the use of exclusive terminology such as "solely", "only", and the like in connection with the recitation of any claim element is contemplated. It is also contemplated that any element indicated to be optional herein may be specifically excluded from a given claim by way of a "negative" limitation. Finally, it is contemplated that any optional feature of the inventive variation(s) described herein may be set forth and claimed independently or in combination with any one or more of the features described herein.

All references cited herein, including publications, patent applications, and patents, are hereby incorporated by reference to the same extent as if each reference were individually and specifically indicated to be incorporated by reference, and were set forth in its entirety herein.

The recitation of ranges of values herein is merely intended to serve as a shorthand method of referring individually to each separate value falling within the range, unless otherwise indicated herein, and each separate value is incorporated into the specification as if it were individually recited herein.

Introduction to a Preferred Embodiment

The invention is a professional carpet cleaning accessory device used to assist carpet cleaners in doing their job while exposing the interiors of the home or building being cleaned to substantially fewer outdoor elements. Structurally, the professional carpet cleaning accessory device includes a slightly trapezoid shaped weighed down structure, with a plurality (ideally 2 or 3) of holes in structure, along with a netting or other tarp-like material.

In one embodiment, the carpet cleaning accessory device comprises a doorstop that is adjustable to fit between a door frame and an open door. Further, the doorstop has a conduit therethrough that is adapted to accept at least one professional carpet cleaning hose. The professional carpet cleaning accessory device further comprises an open-door environmental block that comprises a flexible cloth configurable to substantially block the openings between the open door and the door frame. The professional carpet cleaning accessory device further comprises a cloth curtain (or curtain of other material, such as plastic) adapted to attach to the flexible cloth, as well as a door-and-frame coupling comprising a plurality of clamps. Of course, other coupling means may be used, such as temporary adhesives, tabs and the like.

In one alternative embodiment, the carpet cleaning accessory device comprises a window stop that is adjustable to fit between a window frame and an open window. Further, the window stop has a conduit therethrough that is adapted to accept at least one professional carpet cleaning hose. The professional carpet cleaning accessory device further comprises an open-window environmental block that comprises a flexible cloth configurable to substantially block the openings between the open window and the window frame. The professional carpet cleaning accessory device further comprises a cloth curtain (or curtain of other material, such as plastic) adapted to attach to the flexible cloth, as well as a window-and-frame coupling comprising a plurality of clamps. Of course, other coupling means may be used, such as temporary adhesives, tabs and the like.

DETAILED DESCRIPTION OF AN EMBODIMENT

FIG. 1 illustrates the professional carpet cleaning accessory device 100 in situ while performing cleaning, according to a preferred embodiment of the present invention. The professional carpet cleaning accessory device 100 comprises a doorstop 102 that is adjustable to fit in a building aperture such as a door or window, and is illustrated here as being between a door frame 104 and an open door 106. Further, the doorstop 102 has a conduit 102*a* there through that is adapted to accept at least one professional carpet cleaning hose 108. As used here, an aperture is an opening, hole or gap that is closed via an aperture gate such as a door or window or windowpane.

The professional carpet cleaning accessory device 100 further comprises an open-door environmental block 110 (embodied here as a curtain) that comprises a flexible cloth 112 configurable to substantially block the openings between the open door 106 and the door frame 104. The device 100 further comprises a door-and-frame coupling assembly 114 here defined by a plurality of clamps including a first clamp 114*a*, second clamp 114*b*, third clamp 114*c*, and fourth clamp 114*d*.

The professional carpet cleaning accessory device 100 further comprises a retaining and guiding subsystem, comprising the door stop 102 having the conduit 102*a* therein, as well as an open-door blocking subsystem comprising a curtain 112 of flexible cloth that is configurable to substantially block the openings between the open door 106 and the door frame 104. Further, the invention may comprise a coupling subsystem comprising a cloth coupling (here shown as the clamps that attach to the curtain 112) and a door-and-frame coupling here shown as the claims that attach to the door frame 104. In alternative embodiments, the cloth coupling may be a rivet and the door-and-frame coupling may comprise a plurality of clamps 114 such as 114*a*, 114*b*, 114 and 114*d*.

The plurality of clamps when used in conjunction with the flexible cloth 112 help to secure the flexible cloth to the door and/or the door frame. For example, the clamps 114*a*, 114*b*, and 114*c* help clamp the flexible cloth to the door and the clamp 114*d* helps to clasp the flexible cloth to the door frame. Once the plurality of clamps are attached, then the flexible cloth substantially blocks the open spaces between the open door and the door frame.

As shown in FIG. 1, the professional carpet cleaning accessory device 100 blocks the open spaces between the open door and the door frame with the flexible cloth 112 and at the same time allows the vacuum hoses for cleaning to enter the structure to the cleaned without substantially exposing the interior of the structure to the outside environment. Accordingly, a single person may easily instal and utilize the invention.

Figure 2:
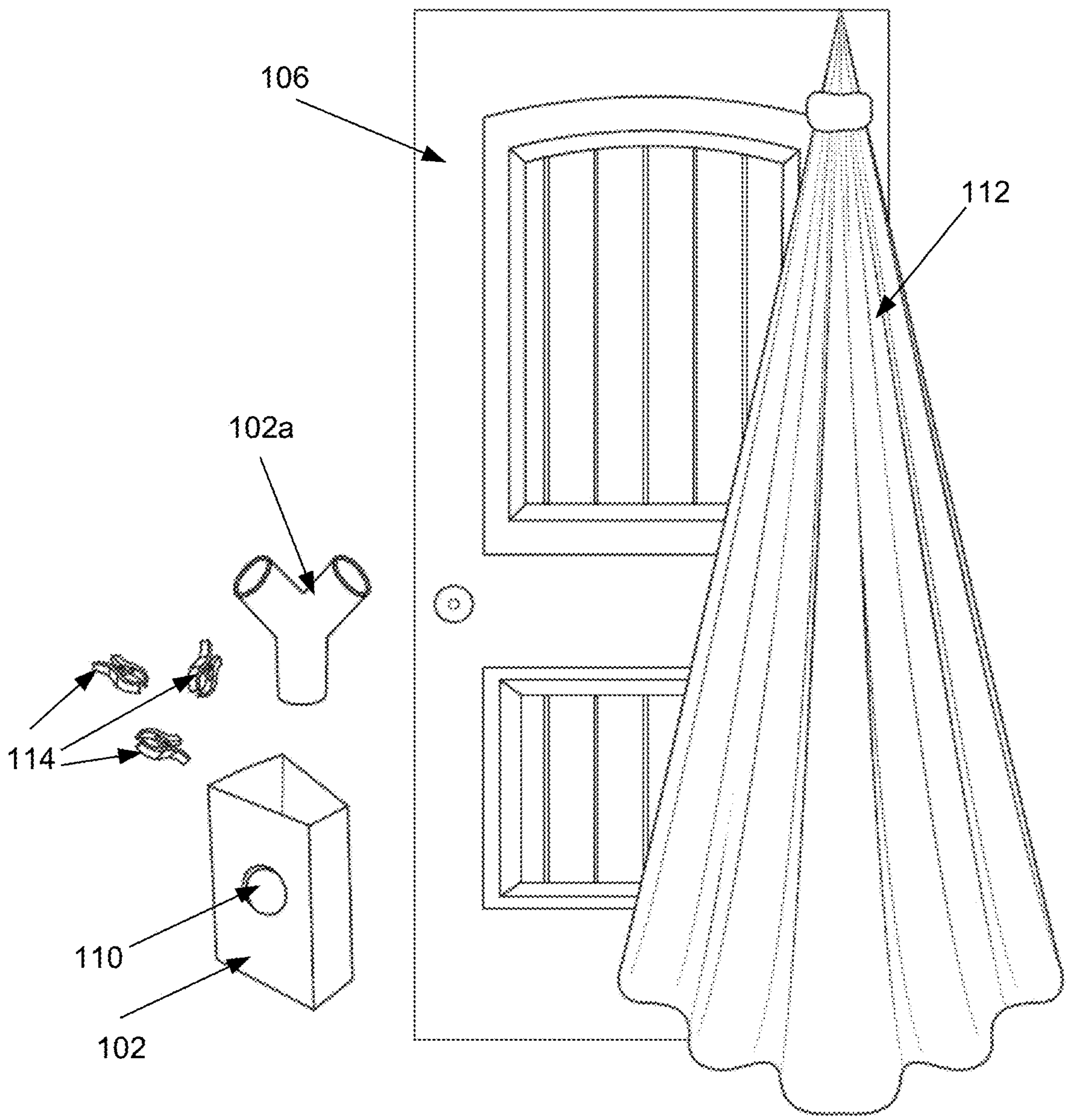
FIG. 2 illustrates the various components involved in the professional carpet cleaning accessory device.

FIG. 2 illustrates various components involved in the professional carpet cleaning accessory device 100. As explained above, the carpet cleaning accessory device 100 of FIG. 1 and FIG. 2 primarily comprises a door stop 102, a conduit 102*a*, a flexible curtain 112 and a clamping mechanism comprising a plurality of clamps 114.

In an embodiment, the doorstop 102 has a plurality of holes 110 is shown as having a trapezoidal shape to accommodate the space between the door and the doorframe and so that the biased pressure of the door closing will accommodate the doorstop 102 more easily. In alternative embodiments, the doorstop is adjustable. For example, the length and height of the parallel sides of the trapezoidal doorstop 102 may be adjustable. Additionally, the non-parallel sides (legs) of the doorstop may be adjustable as well to adjust their angle of intersection (sometimes called a vertex angle) so that the opening spaces between the door and the door frame and can be made smaller and ideally minimized. In an embodiment, the doorstop may be made from either one of: plastic, polycarbonate material, corrugated cardboard, corrugated plastic, a metal, an alloy or any other suitable material that may provide sufficient strength to act as blocking component. Thus, the doorstop 102 props the door 106 open so that a professional carpet cleaning hose 108 may pass through the doorstop via the conduit 102*a*.

In order to fit the doorstop between the open door and the door frame, the doorstop is placed at a ground level between the door frame and the open door such that a side of the trapezoidal doorstop prevents the door from closing. Preferably, the carpet cleaning accessory device 100 further comprises at least one antiskid object such as an anti-skid pad or gripper affixed at the bottom of the trapezoidal door stop. In one example, an anti skid object may be made of rubber. Alternatively, an antiskid object may comprise of vacuum bushes.

The conduit 102*a* is placed inside the door stop 102 and has a plurality of openings 116 such that the plurality of openings 116 are aligned with each of the plurality of holes 110 in the door stop 102. In an embodiment, at least one professional carpet cleaning hose 108 may be passed via the plurality of openings 116 of the conduit 102*a*. The conduit is one of: straight "1" shape, a Y shape, a T-shape, + shape, or X shaped. Further, the conduit 102*a* may be made from either one or more of: plastic, polycarbonate material, corrugated cardboard, corrugated plastic, a metal, an alloy or any other suitable material that may be able to sufficiently provide support to the professional carpet cleaning hose 108 that is passing through the conduit 102*a*.

The curtain 112 is adapted to attach to the door frame 104 and the door 106 using a clamping mechanism comprising a plurality of clamps. For example, the plurality of clamps comprises a toggle clamp, a spring clamp, a hand screw clamp, and G or C clamp. In another embodiment the curtain 112 is adapted to attach to the door frame 104 and the open door 106 using at least one of: a plurality of rivets, a plurality of fasteners, temporary adhesives, ties, rope, or/and a plurality of magnets. Similarly, curtain 112 is preferably made of one or more of: cotton, wool, spandex, silk, polyester, plastic, leather, or/and linen.

Figure 3:
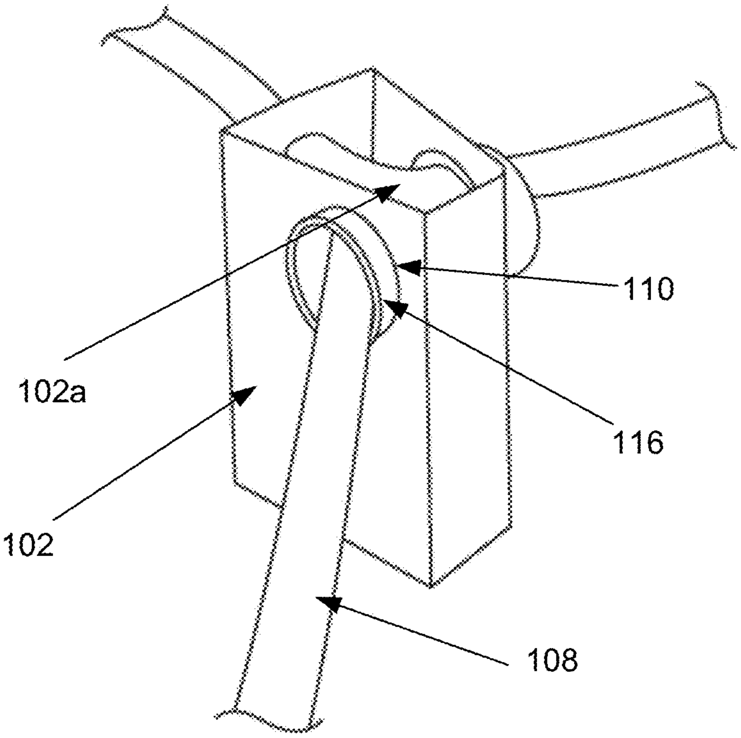
FIG. 3 illustrates the doorstop 102 isolated to make various of its components clearer.

FIG. 3 illustrates the doorstop 102 isolated to make various of its components clearer, in particular the conduit 102*a*. Here, the doorstop 102 is hollow and trapezoidal. The doorstop 102 accommodates a professional carpet cleaning hose 108 therethrough via the conduit 102*a*. The plurality of openings such as the front opening 116 of the conduit 102*a* are in alignment with and preferably coupled to the plurality of holes of the doorstop 102, such as front hole 110. As the holes and the openings are aligned, the professional carpet cleaning hose 108 can be easily directed through the doorstop 102 and via the conduit 102*a*.

In order to fit the door stop between the open door and the door frame, the door stop is placed at a ground level between the door frame and the open door such that a larger side of parallel sides of the trapezoidal door stop prevents the door from closing, as well as from opening further. It has been previously stated that the carpet cleaning accessory device 100 further comprises a plurality of antiskid objects affixed at the bottom of the trapezoidal doorstop. Additionally, similar anti-skid objects may be coupled to the sides of the doorstop, and in particular the leg-sides of the doorstop 102 to facilitate the coupling of the doorstop 102 to both a door frame as well as the door 106.

Figure 4:
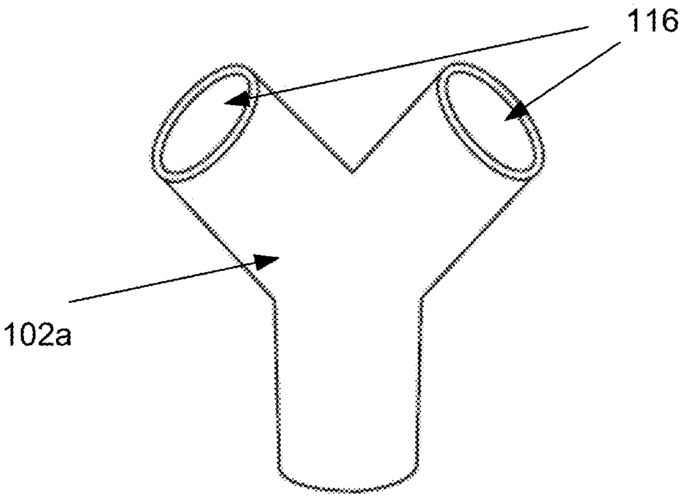
FIG. 4 illustrates a conduit placed within the door stop.

FIG. 4 illustrates an exemplary conduit 102*a*. The conduit 102*a* has a plurality of openings such that the plurality of openings will align with each of the plurality of holes in the corresponding door stop 102. Of course, if other shapes of conduits are chosen, such as an I shape, a T-shape, shaped or an X shape, the doorstop will have holes corresponding to the openings of its respective conduit shape.

Figure 5:
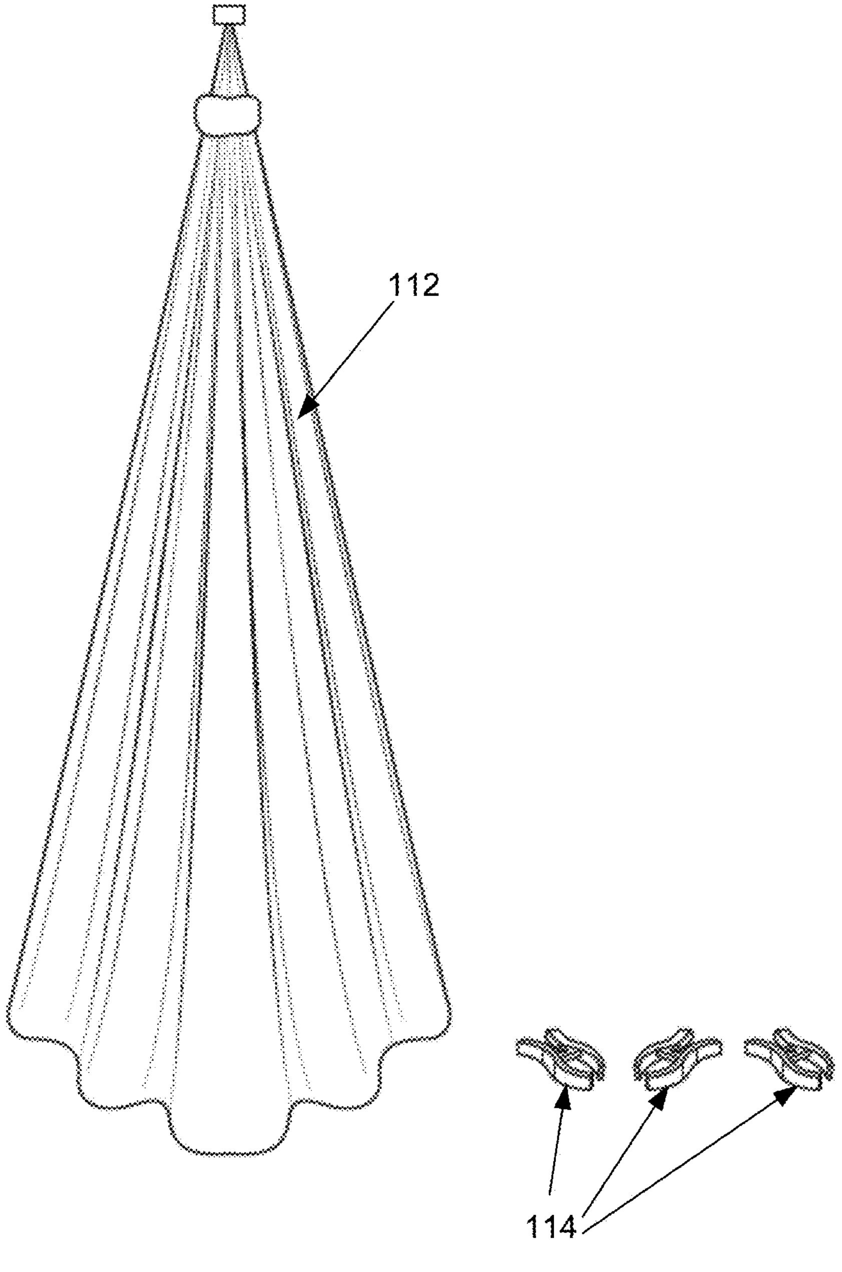
FIG. 5 illustrates a flexible cloth and the plurality of clamps utilized in the professional carpet cleaning accessory device.

FIG. 5 illustrates a curtain 112 of flexible cloth, and a plurality of clamps are shown which may be utilized in an alternative professional carpet cleaning accessory device. The curtain 112 is preferably adapted to attach to the door frame 104 and the open door 106 using a clamping mechanism comprising a plurality of clamps 114. For example, the plurality of clamps comprises a toggle clamp, a spring clamp, a hand screw clamp, and G or C clamp. In another embodiment, the flexible cloth 112 is adapted to attach simultaneously to the door frame 104 and the open door 106 using at least one of a plurality of rivets, a plurality of fasteners, adhesives, ties, ropes, or/and a plurality of magnets. Once the plurality of clamps 114 are attached then the flexible cloth 112 blocks the open spaces between the open door and the door frame. In use, an operator may determine "how much" air to accommodate by the placement of the clamps (or equivalents) to avoid pressure "blowing out" or "sucking in" the curtain and the doorstop, while also preventing the airflow itself from displacing the curtain and/or doorstop.

Figure 6:
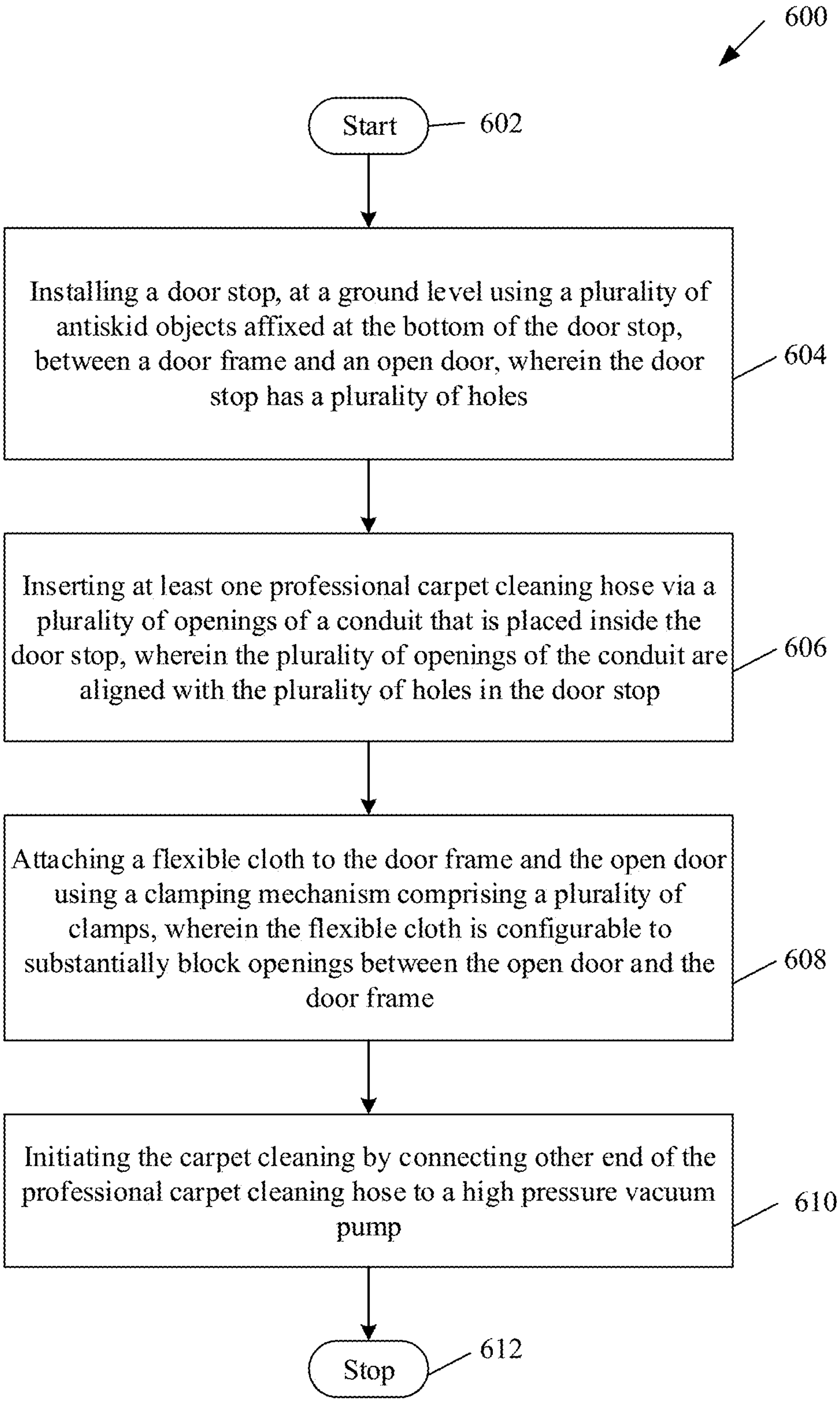
FIG. 6 illustrates a method for carpet cleaning using the professional carpet cleaning accessory device.

FIG. 6 illustrates a method 600 for carpet cleaning using the professional carpet cleaning accessory device, according to a preferred embodiment of the present invention. The method starts with a start act and proceeds to an installing doorstop act 604. In the installing a door stop act 604, a doorstop having a conduit therein is installed at a ground level, between a door frame and an open door, using a plurality of antiskid objects affixed at the bottom of the doorstop.

Next, at an inserting act 606, at least one professional carpet cleaning hose is inserted into a first opening of a conduit, and then the hose(s) exits the conduit through a second opening. Then, in a curtain assembly act 608, a flexible cloth curtain is attached to both the door frame and the open (or "cracked") door using a coupling apparatus, such as a clamping mechanism comprising a plurality of clamps. In a vacuum attachment act 610 a carpet cleaning hose is attached to a high-pressure vacuum pump so that carpet cleaning can be initiated when the vacuum pump is turned on. The method 600 terminates as an end act 612.

While the summary and detailed description show and describe preferred embodiments of the present invention, those skilled in the art recognize those embodiments as examples. The specification does not limit the invention by the specific examples provided. Instead, those skilled in the art recognize variations, changes, and substitutions without departing from the invention. Furthermore, all aspects of the invention are not limited to the specific depictions, configurations, or relative proportions set forth herein which depend upon a variety of conditions and variables. The inventor contemplates that the invention shall cover alternatives, modifications, variations, or equivalents.

The terms "an embodiment", "embodiment", "embodiments", "the embodiment" "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

No language in the specification should be construed as indicating any non-claimed element as essential to the practice of the invention. A description of an embodiment with several components in communication with each other does not imply that all such components are required. On the contrary, a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

A person with ordinary skills in the art will appreciate that the systems, components, and sub-components have been illustrated and explained to serve as examples and should not be considered limiting in any manner. It will be further appreciated that the variants of the above disclosed system elements, components, and sub-components, and other features and functions, or alternatives thereof, may be combined to create other different systems or applications.

Those skilled in the art will appreciate that any of the aforementioned steps and/or system modules may be suitably replaced, reordered, or removed, and additional steps and/or elements, components, and sub-components may be inserted, depending on the needs of a particular application.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A carpet cleaning accessory device, comprising:

a doorstop configured to fit between a door frame and an open door, wherein the doorstop is placed at a ground level and comprises a plurality of holes;

the doorstop comprising a conduit having a plurality of openings, and secured inside the door-stop via coupling each of the plurality of openings with each of the plurality of holes of the doorstop;

at least one professional carpet cleaning hose passing through the plurality of openings of the conduit;

a curtain adapted to couple to the door frame and the open door using a coupling assembly; and the curtain substantially blocking an opening between the open door and the door frame while allowing the at least one professional carpet cleaning hose to perform at least one action to enter a structure to be cleaned without exposing an interior of the structure to outside environmental hazards, wherein the at least one action comprises at least one of: a cleaning action, a rinsing action, a spraying action and a vacuuming action.

2. The carpet cleaning accessory device of claim 1, wherein the coupling assembly comprises a plurality of clamps.

3. The carpet cleaning accessory device of claim 1, further wherein the conduit is placed inside the doorstop and has the plurality of openings such that each of the plurality of openings are aligned with each of the plurality of holes in the doorstop.

4. The carpet cleaning accessory device of claim 1, wherein the coupling assembly is selected from a group consisting of: a plurality of rivets, a plurality of fasteners, or a plurality of magnets.

5. The carpet cleaning accessory device of claim 1, wherein the doorstop is trapezoidal.

6. The carpet cleaning accessory device of claim 5, wherein the doorstop is between the door frame and the open door at the ground level, such that the trapezoidal doorstop prevents the open door from closing.

7. The carpet cleaning accessory device of claim 1, wherein the conduit is selected from a group consisting of: an I shaped conduit, a Y shaped conduit, a T-shaped conduit, a + shaped conduit, or an X shaped conduit.

8. The carpet cleaning accessory device of claim 1, wherein the coupling assembly comprises a coupling selected from a group consisting of: a toggle clamp, a spring clamp, a hand screw clamp, a G clamp or a C clamp.

9. The carpet cleaning accessory device of claim 1, wherein fabric of the curtain is one of: cotton, wool, spandex, silk, polyester, leather, and linen.

10. The carpet cleaning accessory device of claim 1, wherein the carpet cleaning accessory comprising an anti-skid object coupled to the doorstop at a bottom.

11. A carpet cleaning accessory device, comprising:

an aperture stop configured to fit between an aperture frame and an aperture gate, wherein the aperture stop is placed at a ground level and comprises a first hole and a second hole;

the aperture stop comprising a conduit having a first opening and a second opening;

the conduit secured inside the aperture stop such that the first opening couples with the first hole and the second opening couples with the second hole;

at least one professional carpet cleaning hose passing through the first opening and the second opening of the conduit;

a curtain adapted to couple to the aperture frame and the aperture gate using a coupling assembly; and the curtain substantially blocking an opening between the aperture gate and the aperture frame while allowing the at least one professional carpet cleaning hose to perform at least one action to enter a structure to be cleaned without exposing an interior of the structure to outside environmental hazards, wherein the at least one action comprises at least one of: a cleaning action, a rinsing action, a spraying action and a vacuuming action.

* * * * *